United States Patent [19]

Kato et al.

[11] Patent Number: 5,420,709

[45] Date of Patent: May 30, 1995

[54] LIQUID CRYSTAL SPATIAL LIGHT MODULATOR FOR EDGE DETECTION EMPLOYING DIFFUSION IN THE PHOTOCONDUCTIVE LAYER TO ENLARGE IMAGE

[75] Inventors: Naoki Kato; Shuhei Yamamoto; Teruo Ebihara; Rieko Sekura; Junko Yamanaka, all of Tokyo, Japan

[73] Assignee: Seiko Instruments Inc., Japan

[21] Appl. No.: 905,280

[22] Filed: Jun. 26, 1992

[30] Foreign Application Priority Data

Jul. 8, 1991 [JP] Japan .................................. 3-167106

[51] Int. Cl.$^6$ .................................................. G02F 1/13
[52] U.S. Cl. ........................................ 359/72; 430/20; 430/54; 359/55; 382/199
[58] Field of Search ...................... 359/72, 45, 55, 56, 359/100; 382/22; 365/112, 108; 430/20, 54; 355/266, 218, 268, 222, 219

[56] References Cited

U.S. PATENT DOCUMENTS

| | | | |
|---|---|---|---|
| 3,615,395 | 10/1971 | Yamaji et al. | 430/54 |
| 3,882,454 | 5/1975 | Marie et al. | 382/22 |
| 4,063,222 | 12/1977 | Snyder et al. | 365/112 |
| 4,608,327 | 8/1986 | Oka | 430/54 |
| 4,643,533 | 2/1987 | Armitage | 359/72 |
| 4,984,198 | 1/1991 | Kobayashi et al. | 365/108 |
| 5,005,953 | 7/1991 | Kawagishi | 359/63 |
| 5,046,828 | 9/1991 | Takanashi et al. | 359/72 |

OTHER PUBLICATIONS

Xerox Disclosure Journal, "An overcoated photoconductive member for low density line Development", Beun, Feb 1982.

Moddel et al, "High Speed Binary Optically Addressed Spatial Light Modulator", Appl. Phys Lett. 55(6), Aug. 1989 pp. 537–539.

Applied Optics, vol. 28, No. 22, Nov. 1989, New York, US, pp. 4763–4771, D. Armitage et al., "Photoaddressed liquid crystal spatial light modulators".

Applied Optics, vol. 28, No. 22, Nov. 1989, New York, US, pp. 4727–4731, T. Chao, "Real time optical edge enhancement using Hughes LC light valve".

Optics Communications, vol. 87, Feb. 1992, Amsterdam, NL, pp. 150–156, C. C. Mao et al., "Real–time edge enhancement with hybrid amorphous silicon/ferroelectric LC devices".

Primary Examiner—William L. Sikes
Assistant Examiner—Kenneth Parker
Attorney, Agent, or Firm—Adams & Wilks

[57] ABSTRACT

An edge image extraction light modulator forms an edge portion image corresponding to a boundary between two optically equalized portions of a liquid crystal layer. Each portion has a different bistable state and an edge portion optically distinct from the two optically equalized portions. An optical image is written onto the light valve while applying a voltage between two transparent electrode layers of the light valve to effect switching between a first stable optical axis and a second stable optical axis. The light valve is illuminated and the edge portion of the written image is read. A first and a second polarizer are in crossed-Nicols position so that the two optically equalized portions comprise a portion having the written image except for the edge portion thereof and a non-written portion. The edge portion is not optically equal to the two optically equal portions and can thus be detected. A method of driving the edge image extraction light modulator includes writing an optical image onto the light valve by irradiating a photoconductive layer with light. A first pulse voltage is applied to erase and reset the light valve, and a second pulse voltage is applied, having a polarity opposite that of the first pulse voltage, to generate carriers diffusing in the photoconductive film to impart an electric field to the liquid crystal layer and form an enlarged image of the optical image in the light valve. A third pulse voltage, having the same polarity as that of the first pulse voltage, erases a part of the enlarged image except for an edge portion thereof to form an edge enhanced image in the light valve.

23 Claims, 7 Drawing Sheets

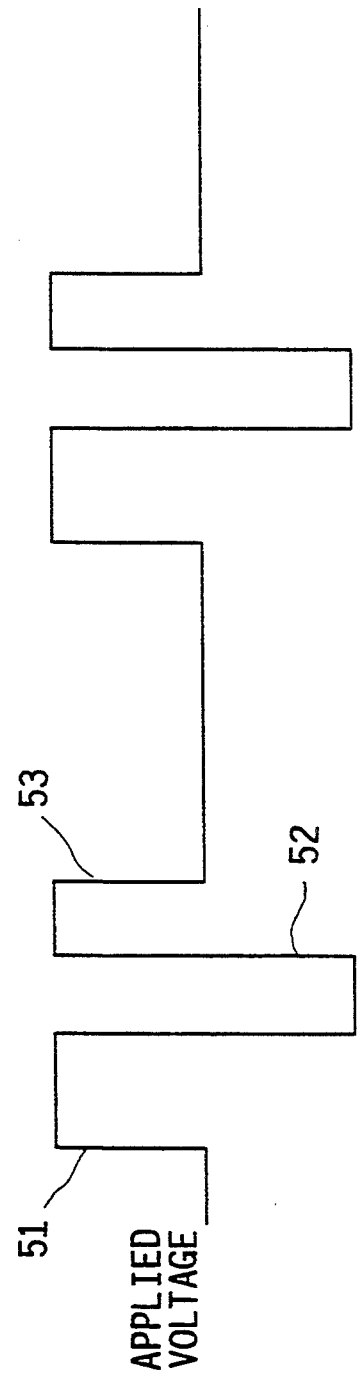
FIG. 5(A) APPLIED VOLTAGE
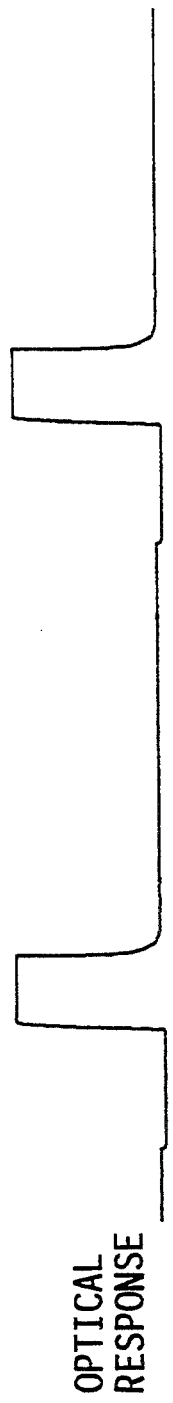
FIG. 5(B) OPTICAL RESPONSE

LIQUID CRYSTAL SPATIAL LIGHT MODULATOR FOR EDGE DETECTION EMPLOYING DIFFUSION IN THE PHOTOCONDUCTIVE LAYER TO ENLARGE IMAGE

BACKGROUND OF THE INVENTION

The present invention relates to a optically writeable spatial light modulator of an liquid crystal type and relates to a driving method thereof, which may be utilized in an image processing device and an optical information processing device. More specially, the liquid crystal type composes a ferroelectric liquid crystal type having optical bistability.

Conventionally, the spatial light modulator of the ferroelectric liquid crystal type is utilized as an optical device for modulating an intensity of inputted image information on real time basis to output the modulated result. Generally, the outputted image is a binarized form of the inputted image. Further, the inventors have disclosed a method of driving the above noted optical modulator to produce an output image having a continuous gradation in Japanese Patent Application No. 239594/1990.

However, according to the conventional driving methods, there is produced only an output image associated to an intensity distribution of an input image. There could not be directly produced an output image in an edge enhanced form or an edge extracted form, which would be useful in optical information processing technology.

SUMMARY OF THE INVENTION

In view of the drawbacks of known optical modulator and conventional driving methods, an object of the present invention is to directly obtain an edge enhancement function useful in the optical information processing technology and to produce an edge extracted image without using a peculiar device structure.

The ferroelectric liquid crystal layer is thinned such that its layer thickness is reduced less than a natural helical pitch so that liquid crystal molecules align in a single crystal texture from the spiral texture. This single crystal texture develops bistable performance such that when a bipolar pulse voltage or a square waveform voltage having a magnitude greater than a threshold level is applied to the liquid crystal layer, a spontaneous polarization of the liquid crystal strongly couples with an electric field of the applied voltage.

The optically switchable spatial light modulator of the ferroelectric liquid crystal type combined with the photoconductive film has basically the same performance. Namely, the magnitude of the applied voltage, an intensity of the readout light and an intensity of the write light are suitably set so that an optical input image of binary data is written and memorized as it is in the binarized form.

If optical input image has a gradation, the binary drive using a pulse voltage is effected so that the written image is binarized and memorized according to a pulse threshold voltage. Alternatively, a gradative drive may be effected using a square waveform voltage superposed with a DC bias voltage so as to read out a gradated image corresponding to an intensity distribution of the input image.

In order to solve the above noted problem, the inventive spatial light modulator of the ferroelectric liquid crystal type is constructed such that a reading optical system is set in a crossed-Nicols mode and a polarization axis of linearly polarized incident light thereof is oriented along an intermediate direction between a pair of optical axes of bistable states of the ferroelectric liquid crystal, or the polarization axis is oriented perpendicular to the intermediate direction. A bipolar pulse is applied while continuously irradiating a writing light and a reading light to drive the modulator to thereby directly produce an edge enhanced or edge extracted image which would be useful for the optical information processing.

If the spatial light modulator is provided with a dielectric mirror, the intensity of the reading light can be increased without affecting the writing performance of the spatial light modulator because the photoconductive film is not irradiated by the readout light, thereby producing a bright and clear read output image.

Further, according to the inventive method of driving the spatial light modulator of the ferroelectric liquid crystal type, instead of using the conventional bipolar pulse voltage or the square waveform voltage, the modulator is applied sequentially with a first pulse voltage effective to erase or reset an image, a second pulse voltage having an opposite polarity to that of the first pulse voltage for writing an image, and a third pulse voltage having the same polarity as that of the first pulse voltage for erasing a part of the written image except for an edge thereof to thereby memorize an edge enhanced image. In such a driving method, the writing light and the readout light are continuously irradiated to optically input image information so as to directly produce the edge enhanced or edge extracted image useful in the optical information processing technology.

According to the present invention, the spatial light modulator of the ferroelectric liquid crystal type is operated such that, the readout optical system is set in the crossed-Nicols mode and the polarization axis of the linearly polarized incident light is oriented along an intermediate direction between a pair of optical axes of the bistable states of the ferroelectric liquid crystal or the polarization axis is oriented perpendicular to the intermediate direction. The pulses of the opposite polarities are applied while the write light and the readout light are continuously irradiated so as to drive the modulator. By such operation, a transmitting light intensity through one stable state of the ferroelectric liquid crystal molecules in the erased state can be equalized to another transmitting light intensity through another stable state of the ferroelectric liquid crystal molecules which are reversed by the writing operation. In this operation, image information is writing by the writing light so that the ferroelectric liquid crystal layer contains two different regions of the bistable states after erasing. According to the invention, these two regions are optically equivalent; however, an irregular zone is left along a boundary between the two regular regions such that the ferroelectric liquid crystal molecules are not aligned uniaxially in the irregular zone. This irregular zone is read out according to the invention, hence the boundary zone is optically different from the remaining regions, thereby obtaining an output image comprised solely of an extracted edge line.

Further, according to the invention driving method, after the first pulse voltage is applied to erase or reset an old image, the second pulse voltage of the opposite polarity is applied to effect the binary writing of a given image. In this stage, an electric carrier concentration is generated initially in the vicinity of an input surface of the photoconductive film. Then, the carrier concentration moves vertically through the photoconductive film to thereby apply an electric field to the ferroelectric liquid crystal layer to induce an inversion of the liquid crystal molecules, while the carrier concentration migrates or diffuses horizontally along input and output surfaces of the photoconductive film. The written or recorded image is slightly enlarged relative to the original input image due to the horizontal diffusion of the carrier. This is observed similarly in the case that a gradated input image is recorded in a binarized form. The polarity of the applied electric field is set such that an electron moves to the ferroelectric liquid crystal layer. Namely, the effective carrier current is the electron current in the writing operation. Further, the third pulse voltage of the same polarity as that of the first pulse voltage is applied to erase a major part of the written image except for an edge portion so as to memorize an edge enhanced image. When the third pulse voltage is applied, a carrier current moves vertically in manner similar to that moment when the second pulse voltage is applied. Since the polarity is opposite, the moving carrier concentration is composed of holes so that the horizontal diffusion degree thereof is smaller than that when the second pulse voltage is applied. When the hole concentration reaches a boundary to the ferroelectric liquid crystal layer, the written image is erased within an activated region. The horizontal diffusion degree is slightly reduced and therefore the input image is not changed in the area corresponding to the difference in diffusion during the course of switching between the second and third pulses, hence the modulator extracts and memorizes an edge of the input image, which corresponds to the horizontally enlarged zone of the written image recorded by the application of the second pulse.

As described above, the spatial light modulator of the ferroelectric liquid crystal type is operated according to the inventive driving method to produce directly the edge enhanced or edge extracted image which would be useful in the optical information processing.

BRIEF DESCRIPTION OF THE DRAWINGS

FIG. 5(A) and FIG. 5(B) are characteristic diagrams showing a driving waveform of the inventive spatial light modulator and an optical response of the spatial light modulator set in a crossed-Nicols condition respectively;

DETAILED DESCRIPTION OF THE PREFERRED EMBODIMENTS

Hereinafter, the present invention will be described in detail with preferred embodiments and drawings.

Figure 3:
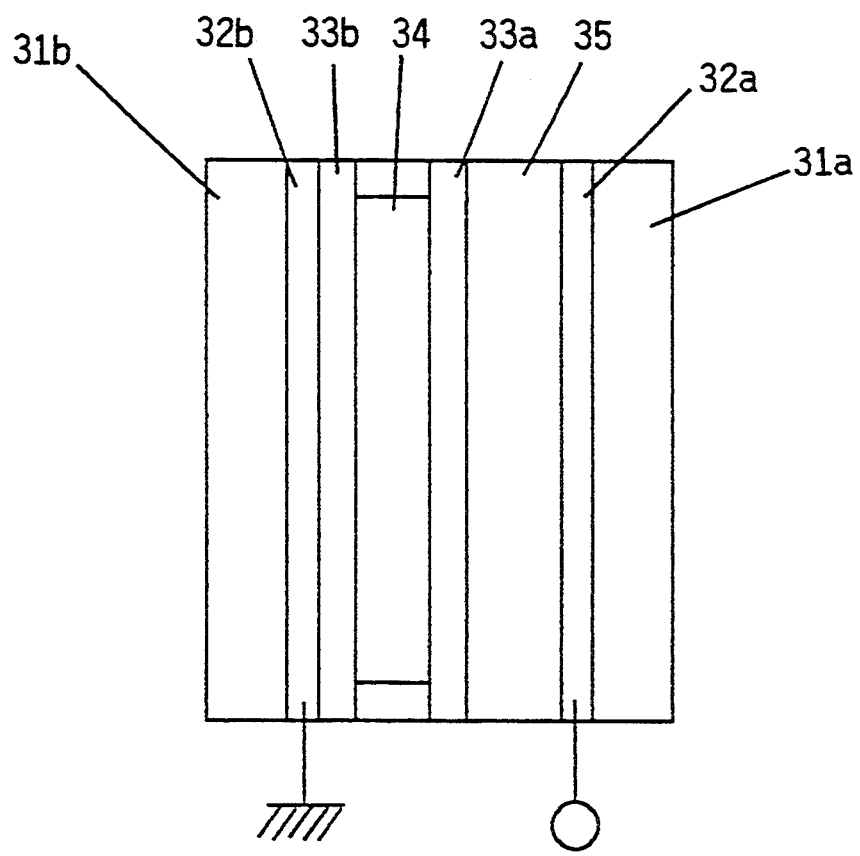
FIG. 3 is a schematic diagram showing a structure of the inventive spatial light modulator.

FIG. 3 is a schematic diagram showing a light valve used in an optically writable spatial light modulator of the ferroelectric liquid crystal type according to the invention. Liquid crystal molecules are sandwiched by a pair of substrates 31a and 31b which are comprised of a transparent glass plate having a thickness of 5 mm and being polished on both faces to ensure a parallel flatness of less than $\lambda/5$ where $\lambda$ denotes a wavelength of He—Ne laser beam. ITO transparent electrode layers 32a, 32b are formed on inner surfaces of the respective substrates. One transparent electrode layer 32a is disposed at an optical writing side, and is formed thereon with a photoconductive layer 35 having a 2.5 $\mu$m thickness and being composed of hydrogenated amorphous silicon (a-Si:H). Further, alignment layers 33a, 33b are formed on the respective substrates such that silicon monooxide is obliquely evaporated at an incident angle of 85° relative to a normal of each substrate and such that respective incident angles are coincident with each other between the writing and reading sides after the pair of substrates are coupled to one another.

The pair of substrates are fixed to each other through a peripheral sealer which is applied by a relief printing method. The sealer contains therein dispersed silica balls having a mean diameter of 1.0 $\mu$m. A gap is formed between the substrates for sandwiching a ferroelectric liquid crystal.

A ferroelectric liquid crystal mixture 34 is composed of, for example, SCE-13 (made by BDH). The mixture is heated over an nematic isotropic phase transition temperature. Thereafter, the mixture is injected into the gap under vacuum, and is then gradually cooled to a smectic C phase to establish a uniform alignment of the liquid crystal molecules.

Next, the operating performance of the built spatial light modulator is described.

Figure 4:
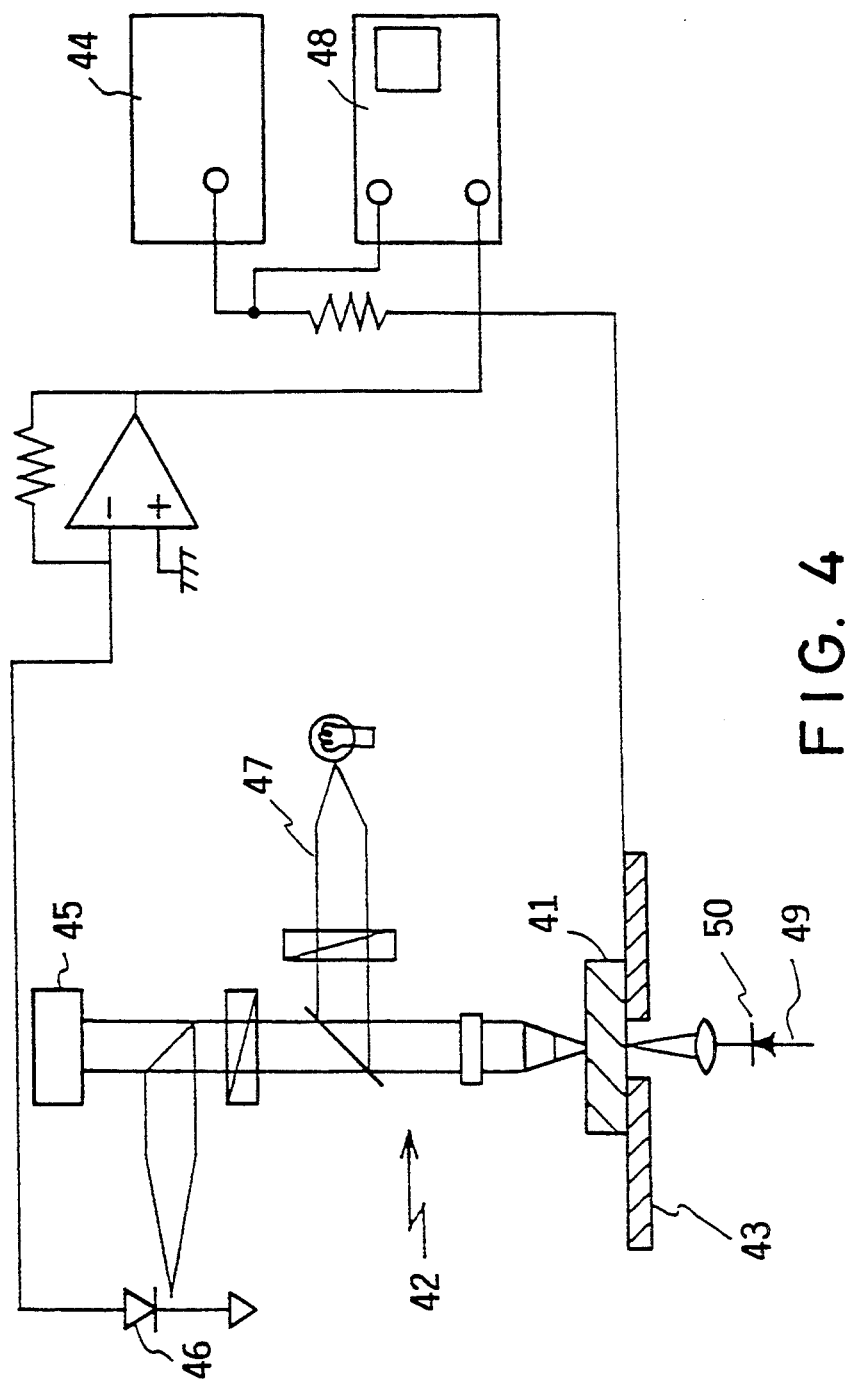
FIG. 4 is a system diagram of the optical system for writing and reading operations.

FIG. 4 is a diagram of an experimental optical system used for write and readout operations. A spatial light modulator 41 is mounted on a stage 43 of a reflection type polarizing microscope 42 set in crossed-Nicols condition. A driving voltage from a voltage source 44 is applied between opposed transparent electrodes of the modulator 41. A PIN photodiode 46 is placed on a focal plane of an eyepiece of the polarizing microscope so as to detect an optical response of an illuminating light 47 after being modulated and reflected by the spatial light modulator. The detected optical response is indicated on an oscilloscope 48 together with a waveform of the applied voltage.

Figure 1:
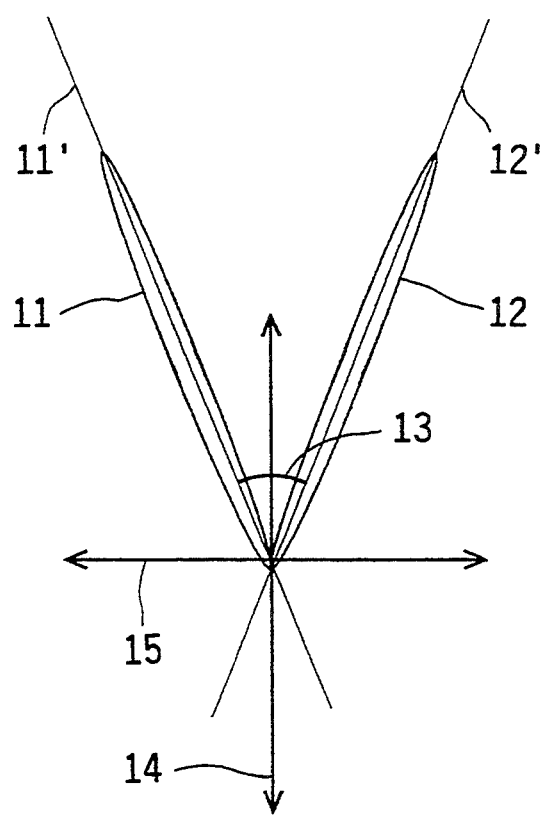
FIG. 1 is a diagram showing relative settings of molecular axis directions of ferroelectric liquid crystal molecules in bistable states and polarization axes of a polarizer and analyzer of a reading optical system in accordance with the inventive spatial light modulator of ferroelectric liquid crystal.
Figure 2:
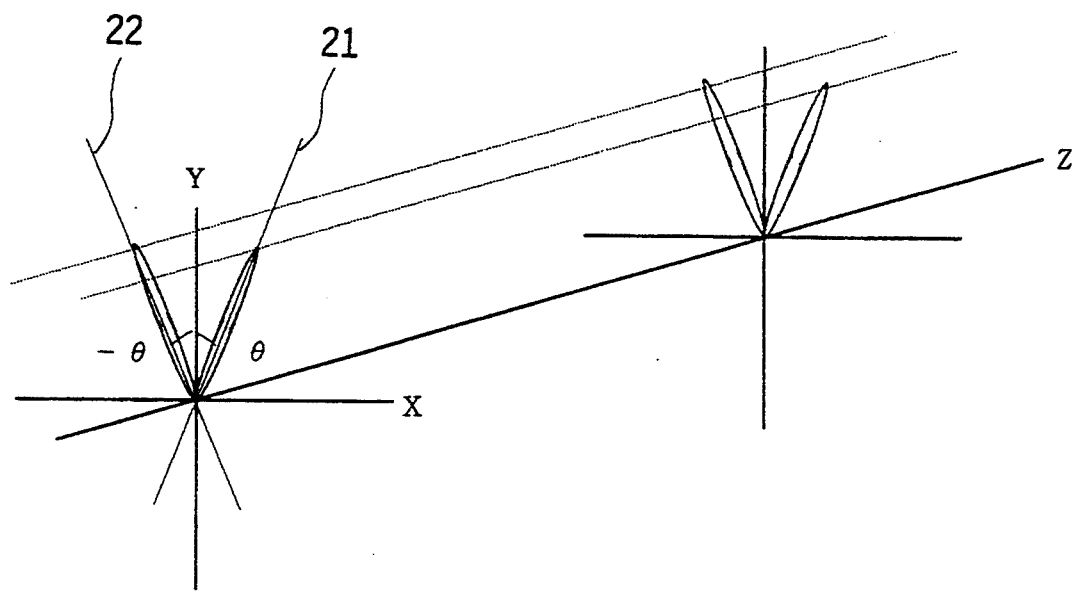
FIG. 2 is a schematic diagram showing the principle of edge enhancement operation according to the invention.

FIG. 1 is a diagram showing relative settings of respective molecule axis directions in bistable states of the ferroelectric liquid crystal molecules and respective polarization axes of a polarizer and an analyzer of the readout optical system in the inventive spatial light modulator of the ferroelectric liquid crystal type. FIG. 2 is a schematic diagram illustrating the principle of the edge enhancement operation according to the invention.

In the present invention, in contrast to the conventional readout optical system, the spatial light modulator of the ferroelectric liquid crystal type is constructed as shown in FIG. 1 such that a polarization axis of a linearly polarized incident light of the readout optical system set in the crossed-Nicols condition is oriented along an intermediate direction between a pair of optical axes of the bistable states of the ferroelectric liquid crystal, or the polarization axis is oriented perpendicular to the intermediate direction.

In this embodiment, the polarizer and the analyzer are set in the crossed-Nicols condition. Then, a single pulse is applied to establish one memorized or stable state while a writing light is irradiated uniformly over the active area of the modulator. The spatial light modulator of the memorized state is rotated to detect one optical axis direction 11' of one stable state 11 of the ferroelectric liquid crystal molecules. Subsequently, another single pulse is applied to establish another memorized or stable state. Then, the spatial optical modulator is rotated to detect another optical axis 12' of another stable state 12 of the ferroelectric liquid crystal molecules. In this embodiment, the pair of optical axes 11' and 12' intersect with each other at a cone angle 13 of 45°. Further, the spatial light modulator is rotated such that a polarization direction 14 of the reading light incident through the polarizer is oriented just between the two optical axis directions 11' and 12'. On the other hand, the analyzer having another polarization direction 15 is set in the crossed-Nicols condition relative to the polarizer.

In the above described settings, pulses of opposite polarities are applied to drive the modulator while the writing light and the reading light are continuously irradiated. By such construction and operation, a transmitted light from one stable state of the ferroelectric liquid crystal molecules in the erased condition can be equalized to another transmitted light from another stable state in which the ferroelectric liquid crystal molecules are reversed by the writing operation. FIG. 2 is referred to explain this performance. Generally, a ferroelectric liquid crystal layer has a folded structure called a chevron; however, the folded structure may have no effect in an optical sense when a linearly polarized light impinges on a layer where ferroelectric liquid crystal molecules are aligned in a planar manner. Actually, there may be an effect that an effective cone angle is reduced; however, it does not cause any problem because the detection of the optical axes 11' and 12' are based on the actual measurement. An incident input light progresses through the layer of the uniaxially aligned ferroelectric liquid crystal molecules through a distance twice as much as a physical thickness d (d = 1.0 μm in this embodiment) of the ferroelectric liquid crystal layer of the spatial light modulator since the modulator is of the reflection type. Provided that the polarization axis of the linearly polarized input light is set along the Y axis of FIG. 2 and it intersects with one optical axis 21 of the ferroelectric liquid crystal held in one of the bistable states at an angle θ (θ = 22.5° in this embodiment), the output light is represented by the formula 1.

Formula 1:

$$(Ex/\cos\theta)^2 + (Ey/\cos\theta)^2 - 2(ExEy/\cos\theta\sin\theta)\cos\delta = EO^2\sin^2\delta$$

$\delta = 2d(Ke - Ko)$, and Ex and Ey denote respectively, electric field components in x and y directions, and further $Ke = \omega e/c$ and $Ko = \omega no/c$.

As understood from the above formula, the output light is generally an elliptically polarized light having a certain wavelength dispersion. This output light is observed through the analyzer which is set in the crossed-Nicols condition relative to the polarizer, hence a linearly polarized light having a particular wavelength spectrum is obtained.

On the other hand, if the ferroelectric liquid crystal is placed in another of the bistable states along another optical axis 22, the polarization plane of the incident light crosses with said another axis at an angle $-\theta(= -22.5°$ in this embodiment). Therefore, the output light is represented by a similar formula which is obtained by replacing $\theta$ by $-\theta$ in the formula 1. Namely, the output light is another elliptically polarized light having a rotation direction is of the ellipse axis which is opposite to the first mentioned output light through the first stable state with respect to Y axis. This output light is observed through the analyzer so that the wavelength spectrum of the obtained linearly polarized light is identical to that in case of the first stable state.

As described above, according to the inventive method, the first stable state, (e.g., an erased state) is optically equalized to the second stable state in which the ferroelectric liquid crystal molecules are reversed or switched to write or record an image.

When the image is written into the inventive spatial light modulator of the ferroelectric liquid crystal type, the liquid crystal layer contains a mixture of one region in which the ferroelectric liquid crystal molecules are reversed and another region in which the molecules are not reversed. Along the boundary between the pair of regions, the ferroelectric liquid crystal molecules are not oriented uniformly in either of the bistable states to produce a transition region. This is inevitably produced in order to minimize an elastic deformation energy of the liquid crystal. This transition region is optically different from the bistable states, hence only this transition region is read out or recognized in the form of an edge extracted image by the above described reading operation.

In this construction, the image information is written or inputted by the writing light through the optical system shown in FIG. 4, so that the modulator can produce an output image in which an edge of the original image is extracted.

According to the inventive method, the spatial light modulator can directly produce the edge enhanced or edge extracted image useful for the optical information processing technology.

Further, when using the spatial light modulator having a dielectric mirror, an intensity of the reading light can be increased without affecting the writing performance of the spatial light modulator because the reading light does not impinge on the photoconductive film, thereby producing a bright and clear read output image.

Figure 6:
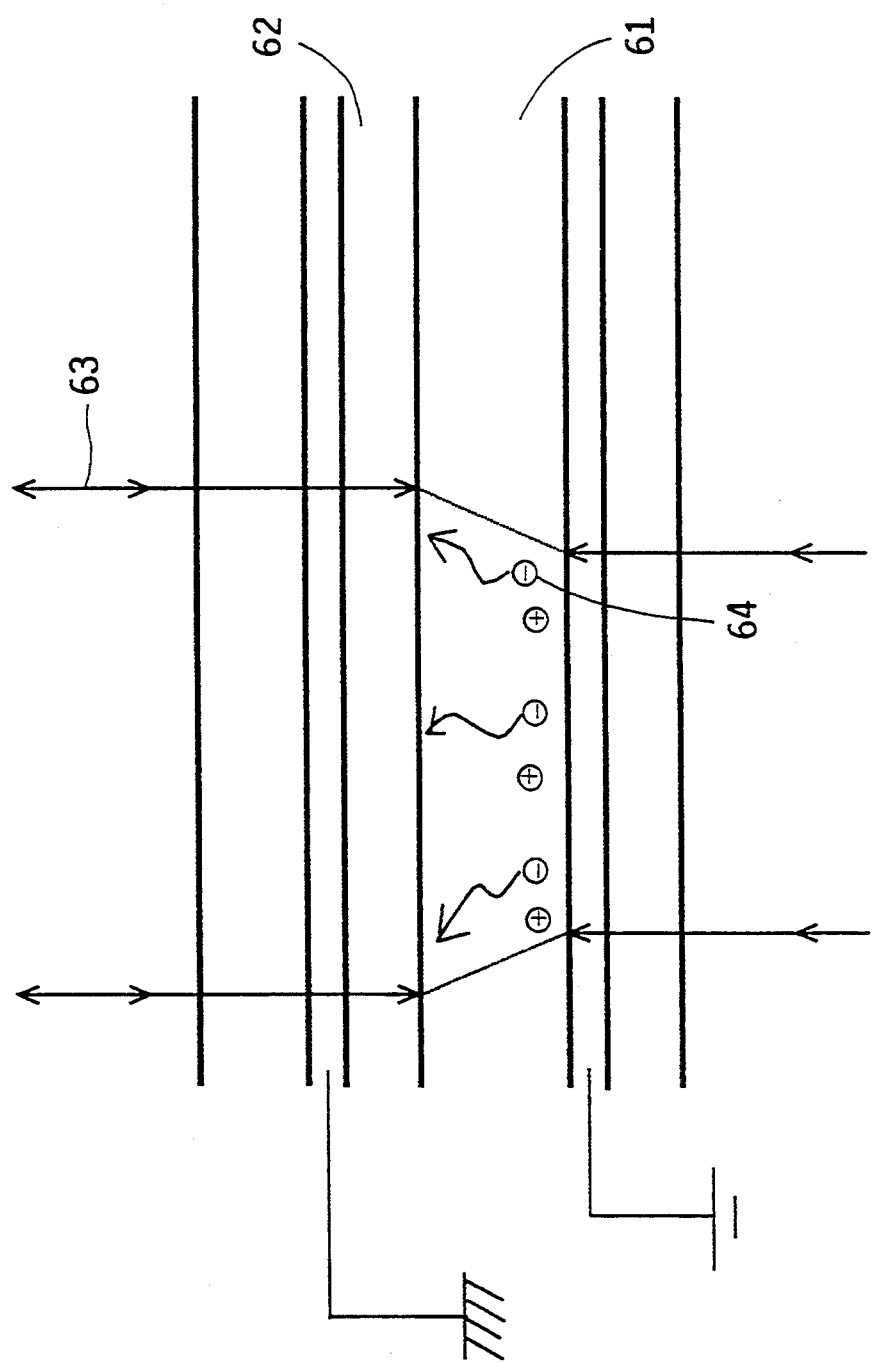
FIG. 6 is a schematic illustration explaining the principle of edge enhancement operation according to the invention.
Figure 7:
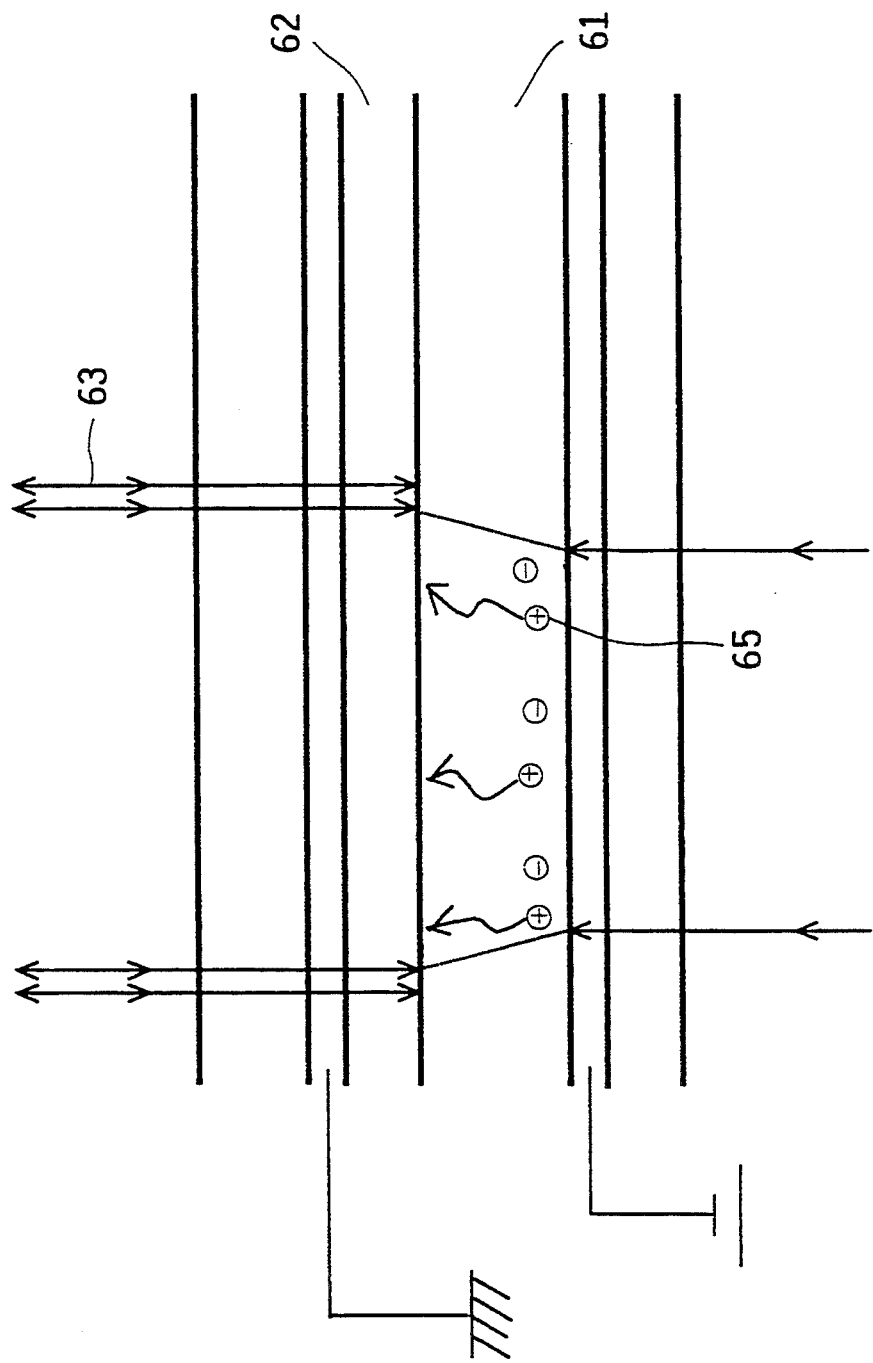
FIG. 7 is a schematic illustration showing the principle of edge enhancement operation according to the invention.
Figure 8:
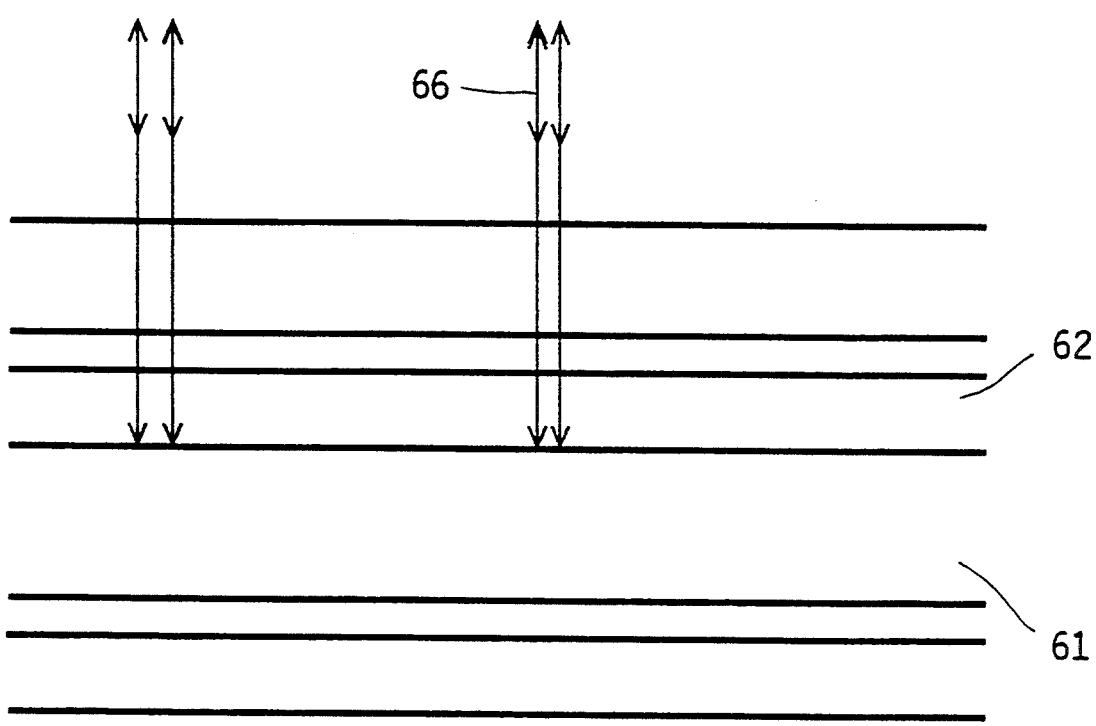
FIG. 8 is a schematic illustration showing the principle of edge enhancement operation according to the invention.

FIG. 5(A) and FIG. 5(B) show a driving waveform of the inventive spatial light modulator and an optical response of the spatial light modulator placed in a crossed-Nicols optical system respectively. FIGS. 6–8 are schematic illustration showing the principle of the edge enhancement operation according to the invention.

In contrast to the conventional bipolar pulse voltage or the square waveform voltage, according to the invention, a first pulse voltage 51 is applied to initially erase or reset an image. Thereafter, a second pulse voltage 52 having the opposite polarity to that of the first pulse voltage is applied to write an optical input image in binarized form. At this stage, as shown in FIG. 6, photo carriers generated in the vicinity of an input surface of a photoconductive film 61 move vertically through the photoconductive film while the carriers 64 horizontally diffuse or migrate along the input and output surface, thereby imparting an electric field to the ferroelectric liquid crystal layer 62 to induce an inversion. An enlarged image 63 is formed, which is enlarged from the input image due to the horizontal diffusion. An input image having gradation may be also written in a binarized form in similar manner. The polarity of the applied electric field is set such that the carrier concentration of electrons 64 move to the ferroelectric liquid crystal layer 62. Further, a third pulse voltage 53 having the same polarity as that of the first pulse voltage is applied so as to erase a part of the written input image except for an edge portion thereof to thereby memorize an edge enhanced image. At this moment as shown in FIG. 7, the carriers move in a manner similar to that moment of applying the second pulse; however, the moving carriers are holes 65 because the applied voltage is of the opposite polarity, so that the horizontal diffusion degree is smaller than that of the electrons when the third pulse voltage is applied. These holes reach the boundary to the ferroelectric liquid crystal layer so that the written image is erased within a given region. In this stage, the input image is not changed at all, while the horizontal diffusion is slightly smaller. Therefore as shown in FIG. 8, the written image is transformed to leave only an edge 66 which corresponds to the peripheral portion enlarged when the image is written by the second pulse.

In the above described embodiment, the first pulse voltage has a pulse width which is set greater than that of the second pulse voltage in order to perfectly effect the initial erasing operation. Further, the second pulse voltage has the same pulse width and the same absolute magnitude as that of the third pulse voltage. The finally memorized edge enhanced image has a line width which corresponds to a difference between an area of the image written by the second pulse voltage and another area erased by the third pulse voltage. This line width can be controlled according to the relation between the pulse widths and the absolute magnitudes of the second and third pulse voltages. Normally, the pulse width or the absolute magnitude of the third pulse voltage may be set smaller than that of the second pulse voltage.

As described above, according to the inventive driving method, the spatial light modulator of the ferroelectric liquid crystal type is operated to directly produce the edge enhanced or edge extracted image which would be useful for the optical information processing technology.

The above described operation can be effected in similar manner with a dielectric mirror interposed between the photoconductive film and the ferroelectric liquid crystal layer. In this case, the reading light does not affect the photoconductive film, hence the modulator can utilize a strong reading light to thereby facilitate application to the optical information processing.

The written image can be read out in a dark background form having an optimum contrast in case that a transmitting axis of the polarizer is set parallel or perpendicular to an optical axis direction of the liquid crystal molecules in the erased state which is stabilized within the reflective optical system set in the crossed-Nicols condition. The read image is of a negative form in which a region illuminated by the readout light exhibits a bright appearance.

Alternatively, the memorized image may be read out in a positive form having a relatively reduced contrast in case that a transmitting axis of the polarizer is set parallel or perpendicular to an optical axis direction of the liquid crystal molecules in the written state stabilized within the reflective optical system set in the crossed-Nicols condition because the stable alignment state of the liquid crystal molecules is reversed.

As described above, according to the invention, the optically writable spatial light modulator utilizing the ferroelectric liquid crystal is constructed and operated to directly produce an edge enhancement or an edge extracted image useful for the optical information processing technology, thereby effectively expanding applications in the optical information processing.

What is claimed is:

1. An edge image extraction light modulator comprising: a light valve for outputting an edge enhanced image after having received incident light having a spatial intensity distribution, the light valve comprising a first transparent substrate having a transparent electrode layer, a photoconductive layer, and a liquid crystal alignment layer successively formed, a second transparent substrate having a transparent electrode layer and a liquid crystal alignment layer successively formed, the second transparent substrate being opposed to the first transparent substrate, and a liquid crystal material having first and second stable states, each of the stable states having a corresponding optical axis, the liquid crystal material being interposed between the two transparent substrates; optical writing means for writing an optical image onto the light valve; voltage applying means for applying voltage between the two transparent electrodes to effect switching of the liquid crystal material between the first stable optical state and the second stable optical state; and optical reading means having light illuminating means for providing light, photo-detecting means, the photo-detecting means reading out an edge portion of the written image on the light valve under an incident light irradiated from the light illuminating means onto the light valve and a first polarizer disposed between the light valve and the illuminating means, a polarization axis of incident light through the first polarizer being oriented either along or perpendicular to an intermediate direction between the two stable optical axis of the liquid crystal material.

2. An edge image extraction light modulator according to claim 1; wherein the liquid crystal material comprises ferroelectric liquid crystal material.

3. An edge image extraction light modulator according to claim 1; wherein the light valve further comprises a dielectric mirror layer formed between the photoconductive layer and the liquid crystal alignment layer formed on the first substrate.

4. An edge image extraction light modulator according to claim 1; wherein the optical reading means further comprises and a second polarizer disposed between the light valve and the photo-detecting means, a polarization axis of the second polarizer being oriented perpendicular to the intermediate direction so that the portion of the written image except for the edge portion thereof, which has the second stable optical axis, is optically equalized to a non-written portion having the first stable optical axis, and the edge portion is not optically equal to the portion of the written image.

5. An edge image extraction modulator according to claim 1; wherein the optical reading means further comprises a second polarizer disposed between the light valve and the photo-detecting means, a polarization axis of the second polarizer being oriented along the intermediate direction so that the portion of the written image except for the edge portion thereof, which has the second stable optical axis, is optically equalized to a non-written portion having the first stable optical axis, and the edge portion is not optically equal to the portion of the written image.

6. An edge image extraction light modulator according to claim 1; wherein the portion of the written image on the light valve has the first stable optical axis in the liquid crystal material switched from the second stable optical axis while applying the voltage between the two transparent electrodes and being irradiated with a light from the light illuminating means, and the edge portion of the written image has the second stable optical axis.

7. A method of driving an edge image extraction light modulator to extract an edge image from one input image, the edge image extraction light modulator having optical writing means, optical reading means, voltage applying means, and a light valve comprised of a first transparent substrate having thereon a transparent electrode layer and a photoconductive layer, a second transparent substrate having thereon a transparent electrode layer and being opposed to said first transparent substrate, and a liquid crystal material interposed between the transparent substrates, the method of driving the modulator comprising the steps of: applying a first pulse voltage to the transparent electrodes for erasing an old image on the light valve; applying a second pulse voltage having an opposite polarity to that of the first pulse voltage to the transparent electrodes for writing an optical input image on the light valve by irradiating a writing light from the optical writing means and effective to generate a greater carrier diffusion than that generated by the first pulse voltage in the photoconductive layer to impart an electric field to the liquid crystal material and form an enlarged image of the optical input image on the light valve; and extracting an edge-enhanced output image from the previously written optical input image without writing another optical input image on the light valve by applying a third pulse voltage having a same polarity as that of the first pulse voltage to the transparent electrodes for erasing a part of the written optical input image except for an edge portion thereof by irradiating the writing light from the optical reading means to produce the edge-enhanced output image.

8. A method of driving an edge image extraction light modulator according to claim 7: wherein; the liquid crystal material comprises ferroelectric liquid crystal material having bistable optical states.

9. A method of driving an edge image extraction light modulator, comprising the steps of: providing a light valve having a first transparent substrate having a photoconductive layer and a transparent electrode layer formed thereon, a second transparent substrate having a transparent electrode layer formed thereon, and a liquid crystal material disposed between the first transparent substrate and the second transparent substrate; writing an optical image onto the light valve by irradiating the photoconductive layer with light; applying a first pulse voltage to the transparent electrode layers to erase and reset the light valve; applying a second pulse voltage to the transparent electrode layers, having a polarity opposite that of the first pulse voltage, effective to generate a greater carrier diffusion than that generated by the first pulse voltage in the photoconductive layer to impart an electric field to the liquid crystal material and form an enlarged image of the optical image on the light valve; and applying a third pulse voltage to the transparent electrode layers, having a polarity the same as that of the first pulse voltage, effective to erase a part of the enlarged image except for an edge portion thereof to form an edge enhanced image on the light valve.

10. A method of driving an edge image extraction light modulator according to claim 9; further comprising the step of controlling the first pulse voltage to a greater pulse width than that of the second pulse voltage to completely erase the light valve.

11. A method of driving an edge image extraction light modulator according to claim 9; further comprising the step of controlling the second pulse voltage to have the same pulse width and absolute magnitude as that of the third pulse voltage to form an edge enhanced image having a line width corresponding to a difference between the enlarged image and the optical image.

12. A method of driving an edge image extraction light modulator according to claim 9; further comprising the step of controlling the relation between the pulse width and absolute magnitude of the second and third pulse voltages to control the line width of the edge enhanced image.

13. An edge image extraction light modulator, comprising: a light valve for outputting an edge portion image of a written image, the edge portion image corresponding to a boundary between two optically equalized portions of a liquid crystal material, each portion having a different bistable state and an edge portion optically distinct from the two optically equalized portions, the light valve comprising a first transparent substrate having a photoconductive layer and a transparent electrode layer formed thereon, a second transparent substrate having a transparent electrode layer formed thereon, and a liquid crystal layer disposed between the first transparent substrate and the second transparent substrate; optical writing means for writing an optical image onto the light valve; voltage applying means for applying a voltage between the two transparent electrode layers to effect switching between a first stable optical axis and a second stable optical axis of the liquid crystal material; and optical reading means comprising light illuminating means for illuminating the light valve, and a first polarizer disposed between the light valve and the illuminating means, a polarization axis of incident light through the first polarizer being oriented either along or perpendicular to an intermediate direction between the two stable optical axis of the liquid crystal material photo-detecting means for reading out the edge portion of the written image and a first polarizer disposed between the light valve and the illuminating means, a polarization axis of incident light through the first polarizer being oriented either along or perpendicular to an intermediate direction between the two stable optical axis of the liquid crystal material.

14. An edge image extraction light modulator according to claim 13; wherein the optical reading means further comprises a second polarizer disposed between the light valve and the photo-detecting means, a polarization axis of the second polarizer being oriented perpendicular to the intermediate direction so that the two optically equalized portions comprise a portion having the written image except for the edge portion thereof and a non-written portion, with the edge portion being not optically equal to the two optically equal portions.

15. An edge image extraction light modulator according to claim 13; wherein the optical reading means further comprises a first polarizer disposed between the light valve and the light illuminating means, a second polarizer disposed between the light valve and the photo-detecting means, a polarization axis of the second polarizer being oriented along the intermediate direction so that the two optically equalized portions comprise a portion having the written image except for the edge portion thereof and a non-written portion, with the edge portion being not optically equal to the two optically equal portions.

16. An edge image extraction light modulator according to claim 13; wherein the light valve further comprises a dielectric mirror layer between the photoconductive layer and the liquid crystal material.

17. An edge image extraction light modulator comprising: a light valve for outputting an edge enhanced image after having received incident light having a spatial intensity distribution, the light valve comprising a first transparent substrate having a transparent electrode layer, a photoconductive layer, and a liquid crystal alignment layer successively formed, a second transparent substrate having a transparent electrode layer and a liquid crystal alignment layer successively formed, the second transparent substrate being opposed to the first transparent substrate, and a liquid crystal material having first and second stable states, each of the stable states having a corresponding optical axis, the liquid crystal material being interposed between the two transparent substrates; optical writing means for writing an optical image onto the light valve; voltage applying means for applying voltage between the two transparent electrodes to effect switching of the liquid crystal material between the first stable optical axis and the second stable optical axis; and optical reading means comprising light illuminating means and photo-detecting means for reading out an edge portion of the written image on the light valve under an incident light irradiated from the light illuminating means onto the light valve, a first polarizer disposed between the light valve and the light illuminating means, a polarization axis of an incident light through the first polarizer being oriented along one of an intermediate direction between the two stable axes of the liquid crystal material and perpendicular to the intermediate direction and a second polarizer disposed between the light valve and the photo-detecting means, a polarization axis of the second polarizer being oriented perpendicular to the intermediate direction.

18. An edge image extraction light modulator according to claim 17; wherein the liquid crystal layer comprises ferroelectric liquid crystal material.

19. An edge image extraction light modulator according to claim 17, wherein the light valve further comprises a dielectric mirror layer formed between the photoconductive payer and the liquid crystal layer formed on the first substrate.

20. An edge image extraction light modulator according to claim 17; wherein the portion of the written image on the light valve has the first stable optical state in the liquid crystal material switched from the second stable optical state while applying the voltage between the two transparent electrodes and being irradiated with a light from the light illuminating means, and the edge portion of the written image has the second stable optical state.

21. A method of driving an edge image extraction light modulator having optical writing means, voltage applying means, optical reading means having light illuminating means and having two polarizers set in crossed-Nicols condition with one polarizer being oriented along an intermediate direction between two bi-stable axes of a liquid crystal material, and photo-detecting means; and a light valve comprised of a first transparent substrate having thereon a transparent electrode layer and a photoconductive layer, a second transparent substrate having thereon a transparent electrode layer and being opposed to said first transparent substrate, and the liquid crystal material interposed between the transparent substrates, the method of driving the light modulator comprising the steps of: applying a first pulse from the voltage applying means to the transparent electrodes for writing a first stable state while a writing light is irradiated uniformly over the light modulator; rotating the light modulator having the first written stable state to detect an optical axis direction of one stable axis of the liquid crystal material; applying a second pulse to establish a second stable state; rotating the light modulator to detect another optical axis direction of the other stable axis of the liquid crystal material such that a transmitted light from the first stable axis of the liquid crystal material is optically equalized to another transmitted light from the second stable state of the liquid crystal material.

22. A method of driving an edge image extraction light modulator according to claim 21; wherein the liquid crystal material comprises ferroelectric liquid crystal material having bi-stable optical states.

23. A method of driving an edge image extraction light modulator according to claim 21; wherein the light valve further comprises a dielectric mirror layer formed between the photoconductive layer and the first substrate.

* * * * *